Sept. 16, 1930.  A. H. THOMPSON  1,775,705

LOCK WASHER

Filed May 20, 1929

Inventor
Arthur H. Thompson
By Fred Gerlach
his Atty.

Patented Sept. 16, 1930

1,775,705

UNITED STATES PATENT OFFICE

ARTHUR H. THOMPSON, OF CHICAGO, ILLINOIS, ASSIGNOR TO THOMPSON BREMER & CO., OF CHICAGO, ILLINOIS, A CORPORATION OF ILLINOIS

LOCK WASHER

Application filed May 20, 1929. Serial No. 364,351.

The invention relates generally to lock-washers for nuts. More particularly the invention relates to that type of lock washer which comprises a substantially flat ring-shaped body having one of the margins thereof cut so as to form pairs of tongues which face one another and are bent in opposite directions so as to grip or engage the contiguous faces of the nut and work in order to prevent rotation of the nut.

One object of the invention is to provide a lock washer of the aforementioned type in which the ring-shaped body is so cut or formed that the tongues cannot overlap in the event that they stretch as a result of being bent relatively to the body.

Another object of the invention is to provide a lock washer which is generally of new and improved construction, may be manufactured at a comparatively low cost and is exceedingly efficient in operation.

Other objects of the invention and the various advantages and characteristics of the present washer construction will be apparent from a consideration of the following detailed description.

The invention consists in the several novel features hereinafter set forth and more particularly defined by claims at the conclusion hereof.

Figure 1:
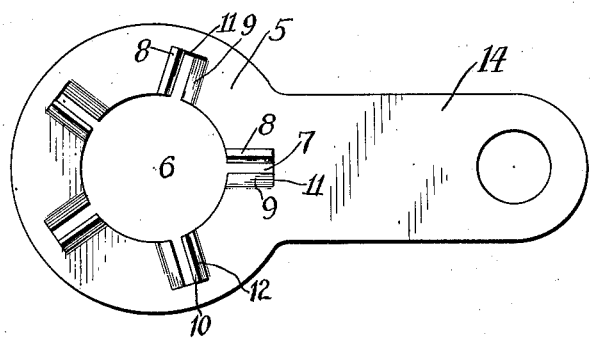
Figure 3:
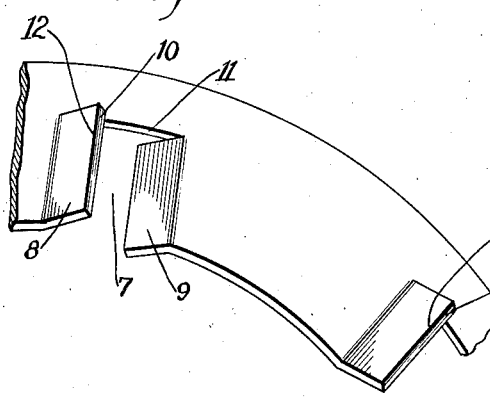
Figure 2:
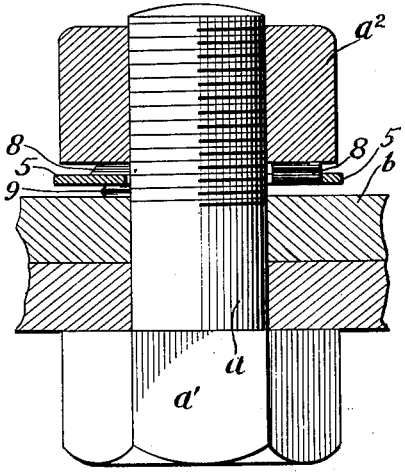
Figure 4:
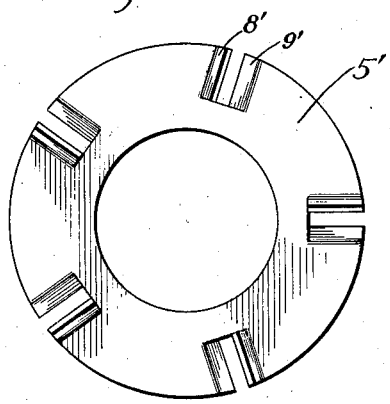

In the drawing which accompanies and forms a part of this specification or disclosure and in which like numerals of reference denote corresponding parts throughout the several views: Fig. 1 is a plan of a washer embodying the invention. Fig. 2 is a sectional view showing the washer on a bolt which is used to secure together in clamped relation a pair of plates. Fig. 3 is a perspective of a portion of the washer on an enlarged scale. Fig. 4 is a plan of a washer embodying a second or modified form of the invention.

The lock-washer which forms the subject matter of this invention is formed of sheet metal and comprises an annular or ring-shaped body 5. The latter is provided with a central opening 6 for receiving the shank $a$ of a bolt $a'$. This bolt, as illustrated in the drawing, is associated with a plate $b$ and embodies a nut $a^2$. The washer is adapted to lock the nut $a^2$ against rotation relatively to the bolt $a'$ and the plate or work $b$. An annular series of notches 7 is cut in the body of the washer. These notches extend radially outward from the hole 6 and are formed so that the sides thereof are substantially parallel. The portion of the body that is disposed at one side of each notch is bent obliquely upward to form a tongue 8. The portion of the body at the other side of each notch is bent obliquely downward to form a tongue 9. By having the tongues extend in opposite directions from the body 5, the contiguous face of the work $b$, as well as the under face of the nut $a^2$, is engaged and gripped securely. In order to facilitate bending of the metal, slits 11 are formed in the body 5 at the inner ends of the notches 7. These slits are straight and extend at right angles to the notches. They permit the tongues to bend so that all parts thereof lie flat and project obliquely at the same angle from the body. The free ends 10 of the tongues 8 and 9 are disposed in planes which are substantially parallel to the body 5 and to one another. As a result of this arrangement the outer corners 12 of the tongues present elongated sharp edges which are parallel to the body and grip the nut and work throughout their entire radial length. In bending the tongues relatively to the body, the metal stretches and tends to increase the circumferential length of the tongues. To prevent the tongues from overlapping when forced together by the action of the nut $a^2$, the notches 7 are made of sufficient width. In the event that the washer is to be used as an electrical connector an arm 14 is formed on the body 5.

In the form of washer exhibited in Figure 4 the tongues 8' and 9' are formed at the outer margin of the body 5' instead of the inner margin. The arrangement of the tongues is, however, similar to that of the tongues 8 and 9.

The washer herein disclosed is exceedingly simple as far as construction is concerned and operates efficiently by virtue of the fact that provision is made for preventing the tongues from overlapping in the event that they are stretched when bent outwardly relatively to the body. By using straight slits 11 in the body, the tongues are of maximum strength and bending is facilitated.

The invention is not to be understood as restricted to the details set forth, since these may be modified within the scope of the appended claims without departing from the spirit and scope of the invention.

Having thus described the invention, what I claim as new and desire to secure by Letters Patent, is:

1. A lock-washer consisting of a flat ring-shaped body formed of thin resilient metal and having an annular series of radially extending notches cut in one of the margins thereof, said body being slit circumferentially at the inner ends of the notches to form tongues at the sides of the notches, said tongues being bent obliquely relatively to the body so that the free or outer edges thereof are parallel to the body, the notches being of such width that sufficient material is removed from the body between the tongues to prevent said tongues from overlapping in the event they stretch as a result of being bent obliquely.

2. A lock-washer consisting of a flat ring-shaped body formed of thin resilient metal and having an annular series of radially extending notches cut in one of the margins thereof, said body having straight slits at the inner ends of the notches to form tongues at the sides of the notches, said tongues being bent obliquely relatively to the body so that the free or outer edges thereof are parallel to the body, the notches being of such width that sufficient material is removed from the body between the tongues to prevent said tongues from overlapping in the event they stretch as a result of being bent obliquely.

Signed at Chicago, Illinois, this 8th day of May, 1929.

ARTHUR H. THOMPSON.